(12) United States Patent
Suzuki (10) Patent No.: US 10,836,322 B2
(45) Date of Patent: Nov. 17, 2020

(54) CONSOLE BOX

(71) Applicant: KOJIMA INDUSTRIES CORPORATION, Toyota (JP)

(72) Inventor: Takahiro Suzuki, Toyota (JP)

(73) Assignee: KOJIMA INDUSTRIES CORPORATION, Toyota (JP)

( * ) Notice: Subject to any disclaimer, the term of this patent is extended or adjusted under 35 U.S.C. 154(b) by 125 days.

(21) Appl. No.: 16/358,782

(22) Filed: Mar. 20, 2019

(65) Prior Publication Data

US 2019/0291650 A1 Sep. 26, 2019

(30) Foreign Application Priority Data

Mar. 23, 2018 (JP) .................. 2018-056025

(51) Int. Cl.
| | | |
|---|---|---|
| *B60R 11/06* | (2006.01) | |
| *B60R 7/04* | (2006.01) | |
| *B60J 10/86* | (2016.01) | |
| *E05F 1/12* | (2006.01) | |

(52) U.S. Cl.
CPC ............... *B60R 7/04* (2013.01); *B60J 10/86* (2016.02); *E05F 1/1215* (2013.01); *E05Y 2900/538* (2013.01)

(58) Field of Classification Search
CPC .......... B60R 7/04; B60R 19/34; B60R 19/18; B60R 21/34; B60R 2019/186; H02G 3/088; B60N 2/793; B65D 85/1045; E05Y 2900/538; B62D 21/152
See application file for complete search history.

(56) References Cited

U.S. PATENT DOCUMENTS

| | | | | |
|---|---|---|---|---|
| 8,573,552 | B2 * | 11/2013 | Andersson ............... | B60N 3/10 248/311.2 |
| 9,139,117 | B2 * | 9/2015 | von Rothkirch und Panthen ....... | B60N 3/002 |
| 9,597,991 | B2 * | 3/2017 | Amick ................... | B65D 43/16 |
| 9,731,655 | B2 * | 8/2017 | Nakasone ............ | B65D 43/165 |
| 10,040,397 | B1 * | 8/2018 | Wuerthele ................ | B60R 7/04 |
| 10,183,626 | B2 * | 1/2019 | Thomas ................... | B60R 7/04 |
| 2003/0047955 | A1 * | 3/2003 | Bruhnke .................. | B60R 7/04 296/37.8 |
| 2006/0037984 | A1 * | 2/2006 | Misumi .................. | B60N 3/106 224/282 |
| 2008/0035657 | A1 * | 2/2008 | Yamashita ............... | B60R 7/04 220/826 |
| 2009/0058120 | A1 * | 3/2009 | Ioka ........................ | B60N 2/79 296/24.34 |
| 2009/0066103 | A1 * | 3/2009 | Koarai .................. | B60N 2/773 296/24.34 |

(Continued)

FOREIGN PATENT DOCUMENTS

JP 2009143375 A 7/2009

*Primary Examiner* — Kiran B Patel
(74) *Attorney, Agent, or Firm* — Conley Rose, P.C.

(57) ABSTRACT

A console box includes a box body with an opening, a pair of lid members, and a seal bar. Each lid member is pivotally coupled to the box body via a hinge for opening and closing a corresponding portion of the opening. The pair of lid members are configured to pivot in a same direction for opening or closing the corresponding portions of the opening. The seal bar is configured to close a gap between the pair of lid members. In addition, the seal bar is configured to pivot relative to the box body.

20 Claims, 10 Drawing Sheets

(56) References Cited

U.S. PATENT DOCUMENTS

| | | | | |
|---|---|---|---|---|
| 2009/0174206 A1* | 7/2009 | Vander Sluis | ............ | B60R 7/04 296/24.34 |
| 2010/0050380 A1* | 3/2010 | Fujiwara | ................... | B60R 7/04 16/242 |
| 2011/0121596 A1* | 5/2011 | Beyer | ....................... | B60R 7/04 296/24.34 |
| 2011/0140475 A1* | 6/2011 | Spitler | ...................... | B60R 7/04 296/37.8 |
| 2011/0308043 A1* | 12/2011 | Nakasone | ............... | E05D 5/125 16/380 |
| 2012/0102677 A1* | 5/2012 | Koarai | .................. | E05D 11/087 16/337 |
| 2013/0057011 A1* | 3/2013 | Yamagishi | ................ | B60R 7/04 296/24.34 |
| 2014/0197657 A1* | 7/2014 | Gillis | ....................... | B60R 7/04 296/37.8 |
| 2015/0267451 A1* | 9/2015 | Hirai | ....................... | E05D 11/08 16/279 |
| 2016/0250978 A1* | 9/2016 | Suzuki | ...................... | B60R 7/04 296/37.8 |
| 2018/0022281 A1* | 1/2018 | Hatakeyama | ............. | E05D 7/10 220/811 |
| 2019/0257123 A1* | 8/2019 | Suzuki | ...................... | B60R 7/04 |

\* cited by examiner

CONSOLE BOX

CROSS-REFERENCE TO RELATED APPLICATIONS

This application claims benefit of Japanese patent application serial number 2018-056025 filed Mar. 23, 2018, which is hereby incorporated by reference in its entirety for all purposes.

STATEMENT REGARDING FEDERALLY SPONSORED RESEARCH OR DEVELOPMENT

Not applicable.

BACKGROUND

This application generally relates to the field of console boxes.

JP-A-2009-143375 discloses a console box having a pair of lid bodies (lid members) pivotably assembled to a box main body via a hinge for opening and closing an opening of the box main body. This type of console box may have a cooling function. In such a case, the console box may include a sealing structure around the pair of lid bodies for minimizing leakage of cooled air from the console box, thereby increasing the cooling efficiency.

SUMMARY

In one aspect according to the present disclosure, a console box comprises a box body with an opening, a pair of lid members, and a seal bar. The pair of lid members are each pivotally mounted to the box body via a hinge for opening and closing a corresponding portion of the opening. The pair of lid members are configured to pivot in a same direction for opening or closing the corresponding portions of the opening. The seal bar is configured to close a gap between the pair of lid members and to pivot relative to the box body to follow movement of at least one of the pair of lid members.

In another aspect, pivotal axes defined by the hinges of the pair of lid members are aligned with each other and also aligned with a pivotal axis of the seal bar.

In yet another aspect, the seal bar comprises a spring configured to bias the seal bar toward backside surfaces of the pair of lid members, and each of the backside surfaces is located on the side of a closing direction of the corresponding lid member.

DETAILED DESCRIPTION

Each of the additional features and teachings disclosed above and below may be utilized separately or in conjunction with other features and teachings to provide an improved console box. Representative examples of the present invention, which utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

As previously described, some console boxes with a pair of lid bodies may include a cooling function. In such a case, the console box may include a sealing structure around the pair of lid bodies for minimizing leakage of cooled air from the console box, thereby increasing the cooling efficiency. One may consider adding a sealing structure for sealing a gap between the pair of lid bodies. However, if the console box has such an additional sealing structure for sealing the gap between the pair of lid bodies, the opening of the console box may be divided into two opening portions by the additional sealing structure positioned across the opening of the console box. With this arrangement, accessibility to the inside of the console box may be inhibited due to the additional sealing structure, even when both lids are open.

Accordingly, embodiments described herein are directed to console boxes that include a pair of lid members to cover an opening and sealing structure to seal a gap between the pair of lid members, while ensuring easy accessibility to the inside of the console box.

An embodiment will be described below with reference to FIGS. 1 to 10. For purposes of further explanation and clarity, the upper, lower, front, rear, left and right directions indicated in these figures may be those of a console box 1 in a state where the console box 1 is assembled on a floor of an automobile. However, other embodiments may be implemented in other orientations.

Figure 1:
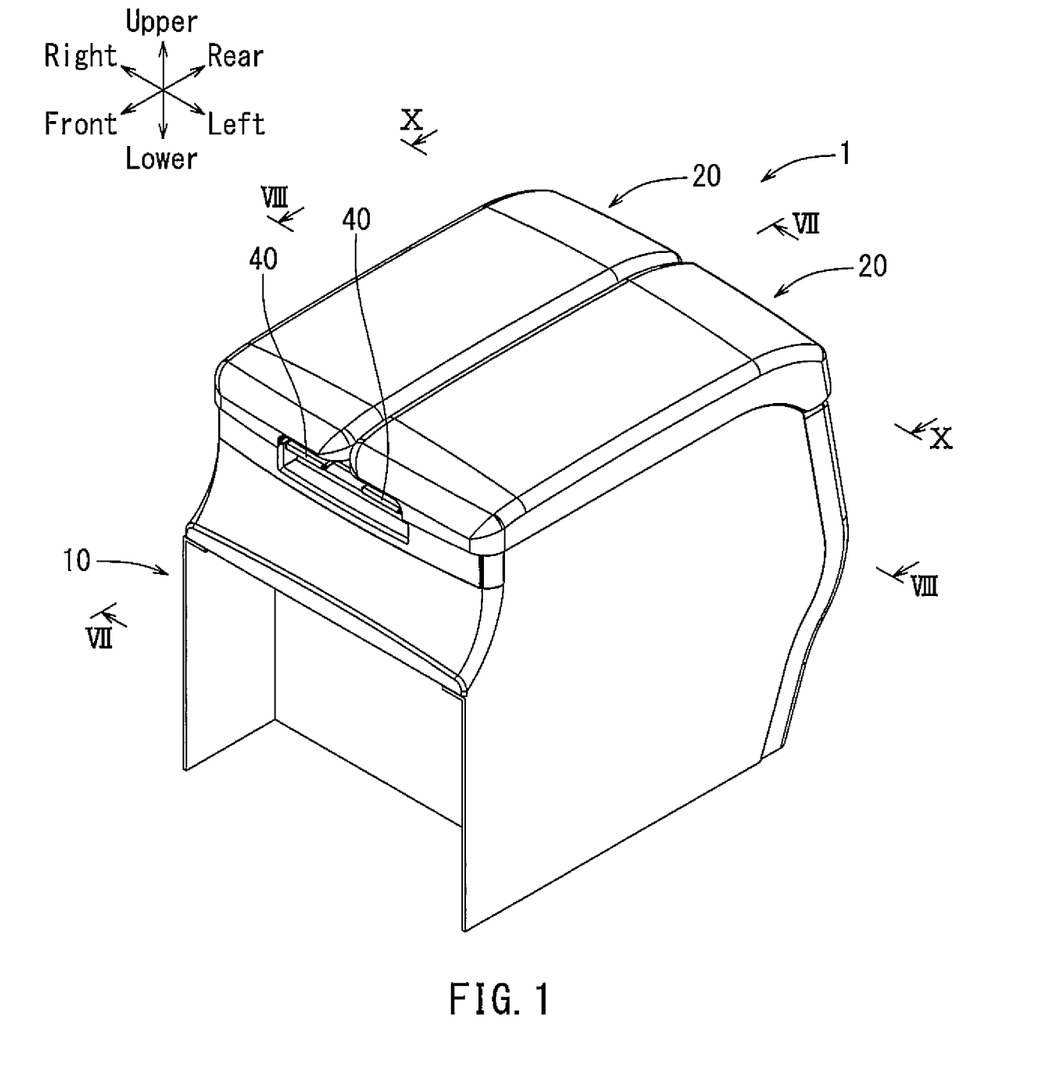
FIG. 1 is a perspective view of a console box according to an embodiment of the present disclosure.

First, an overall structure of the console box 1 will be described. The console box 1 includes a box main body 10, a pair of right and left lid members 20, a lock mechanism 40, and a seal bar 70, as illustrated in FIGS. 1 to 3.

Figure 2:
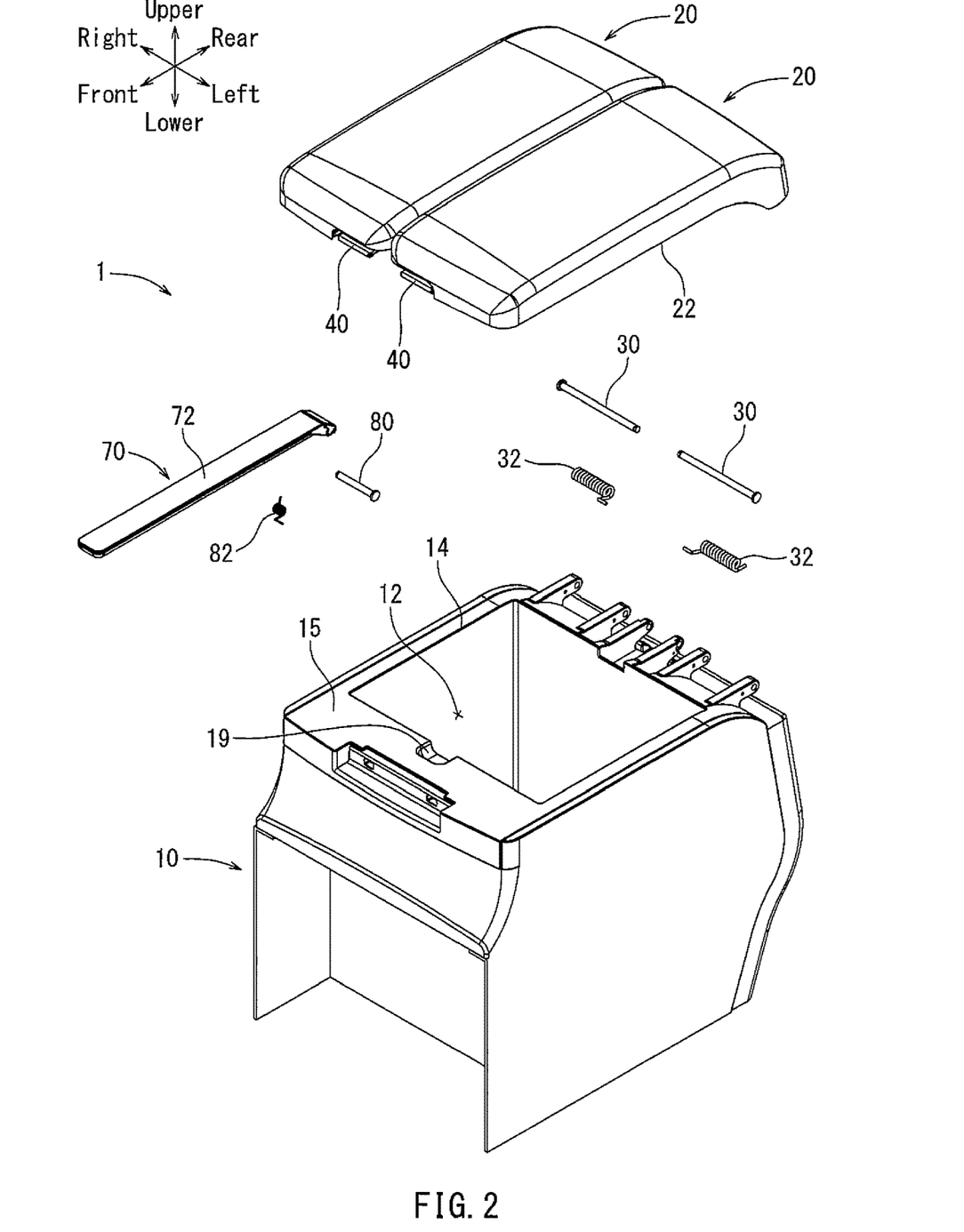
FIG. 2 is an exploded perspective view of the console box of FIG. 1.
Figure 3:
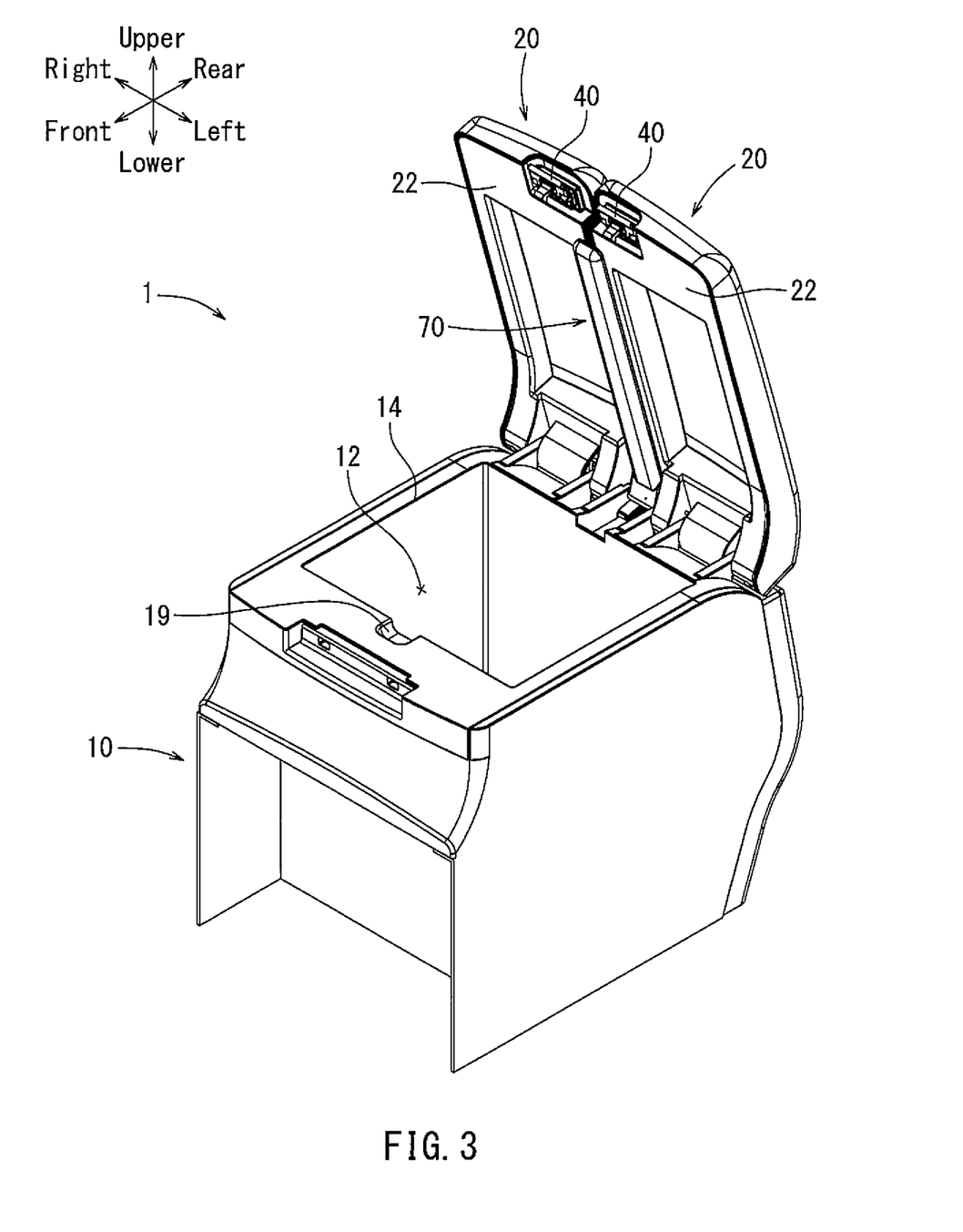
FIG. 3 is a perspective view of the console box of FIG. 1 with the right and left lid members open.
Figure 4:
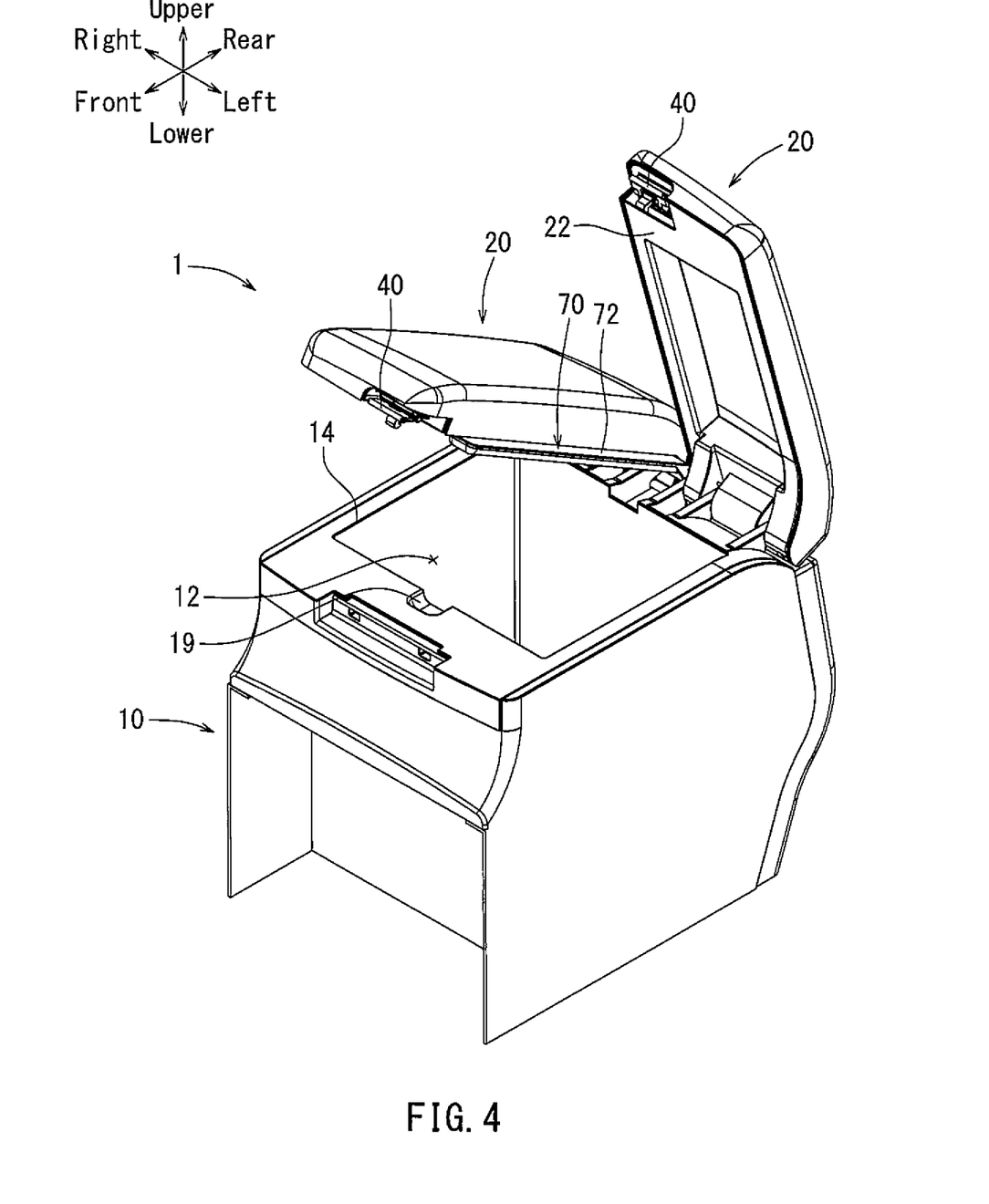
FIG. 4 is a perspective view of the console box of FIG. 1 when the right lid is in the process of closing.

An accommodating space 12 that can accommodate articles (not illustrated) is formed within the box main body 10 (see FIGS. 2 and 3). An opening 14 is provided in the box main body 10 over the accommodating space 12 so that the articles can be in and out of the accommodating space 12 through the opening 14. Furthermore, a cooling mechanism (not illustrated) is disposed within the accommodation portion 12 for lowering the air temperature in the accommodating space 12.

Figure 8:
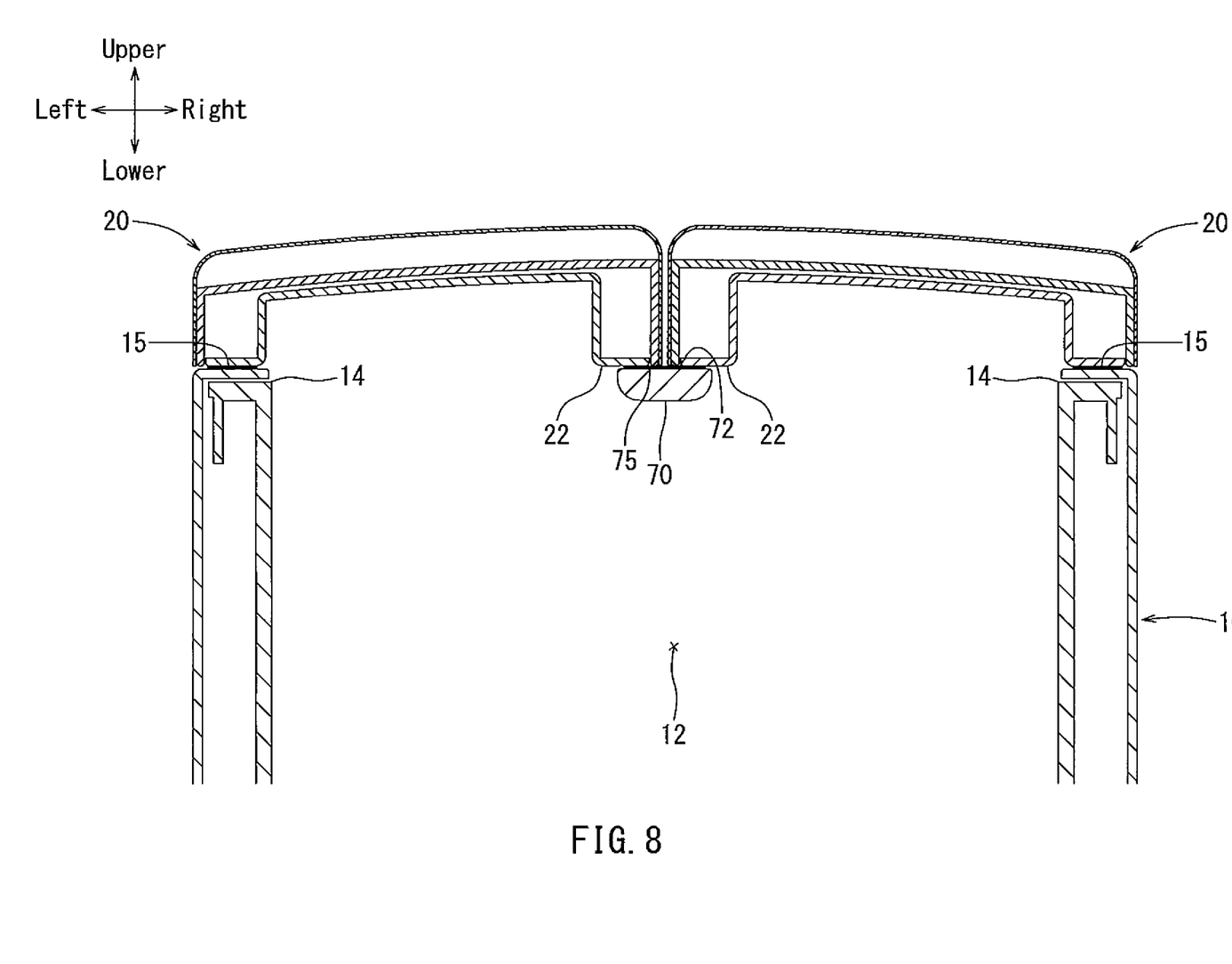
FIG. 8 is a sectional view of the console box of FIG. 1 taken along line VIII-VIII in FIG.
Figure 9:
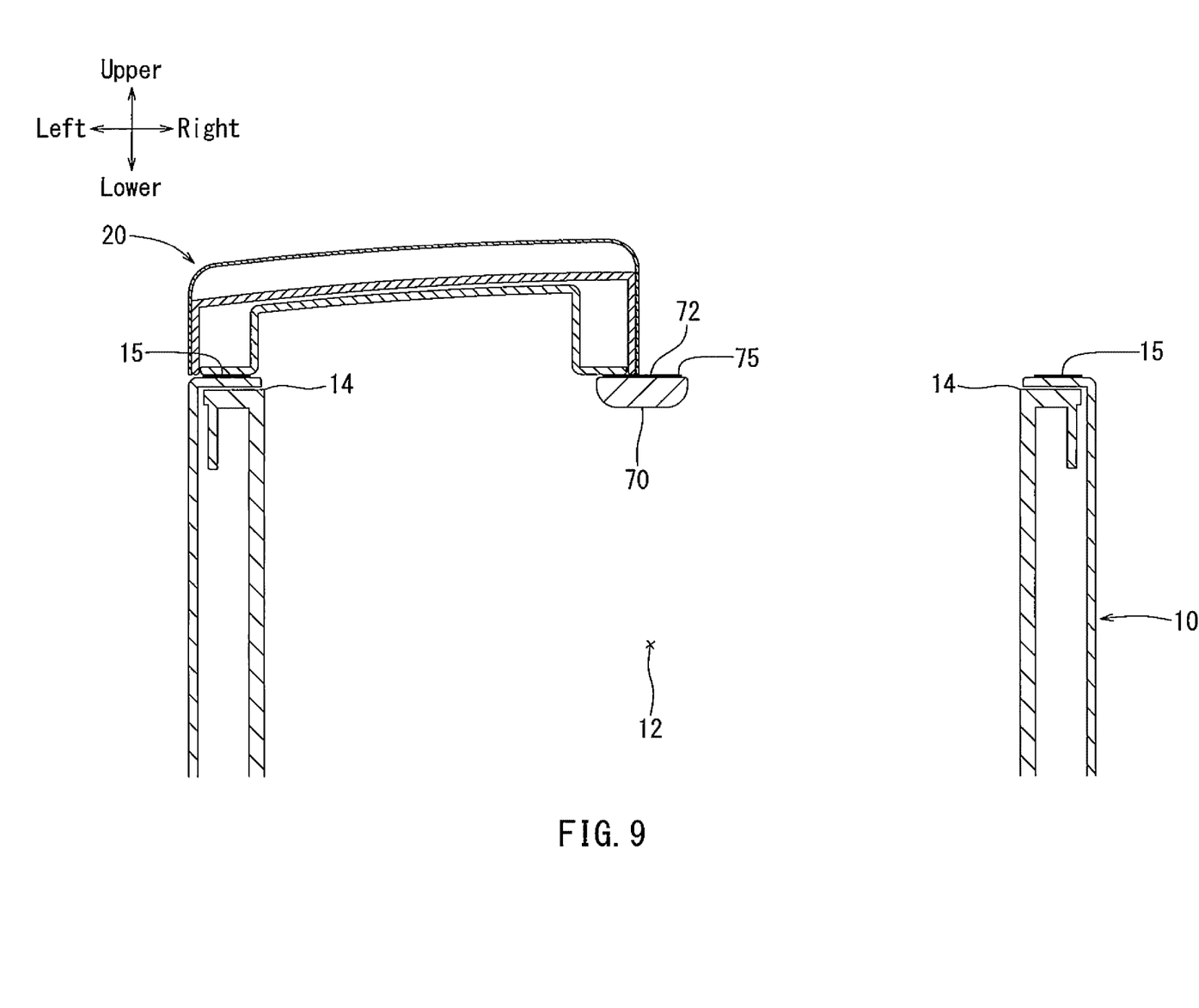
FIG. 9 is a sectional view of the console box of FIG. 1 taken along line IX-IX in FIG. 5.
Figure 10:
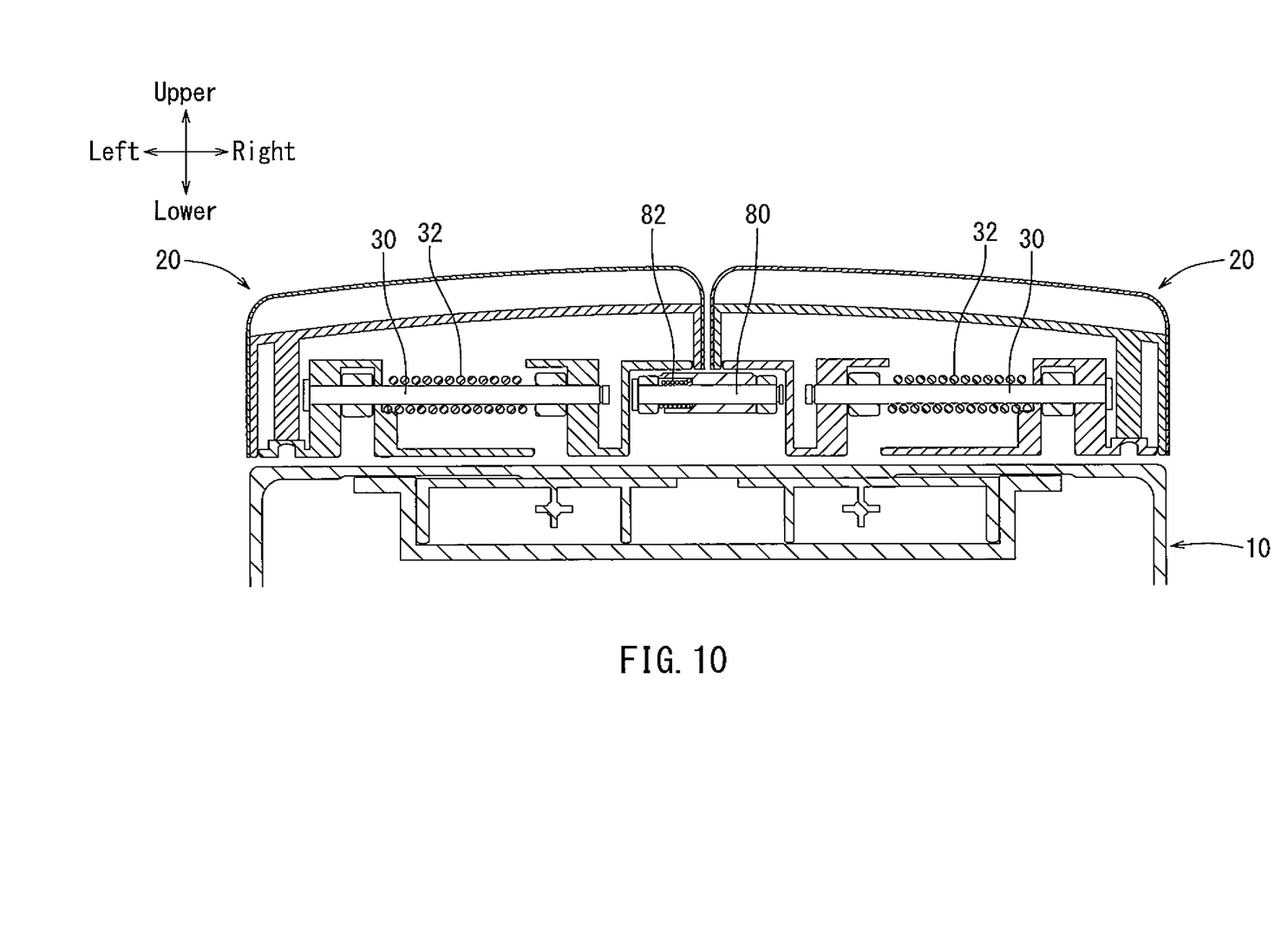
FIG. 10 is a sectional view of the console box of FIG. 1 taken along line X-X in FIG. 1.

A seal member 15 is attached to the upper end surface of the box main body 10 around the opening 14 such that the inner surface of each of the pair of lid members 20 can sealingly contact the seal member 15 when each of the pair of the lid members 20 is closed (see FIGS. 8 and 9). The sealing member 15 can be made of elastic material, such as rubber. With this arrangement, the seal member 15 restricts and/or prevents cooled air from leaking out of the accommodating space 12, thereby reducing a potential decline of the cooling function. A recess 19 is formed in an upper end surface of the front wall of the box main body 10. The recess 19 is sized and positioned to fit with a front end portion of a seal bar 70, described later.

The end sides of the right and left lid members 20 are coupled to the box main body 10 via hinge pins 30. With this arrangement, the right and left lid members 20 can pivot about the hinge pins 30 such that front end sides of the right and left lid members 20 can move in the front-to-rear direction for opening and closing the opening 14. The right and left lid members 20 are biased by torsional springs 32 in opening directions for opening the right and left lid members 20. The box main body 10 of the console box 1 may be affixed to the floor of the automobile between a driver's seat and a front passenger's seat (not illustrated).

Right and left lock mechanisms 40 are disposed at the front edges of the right and left lid members 20, respectively. Each of the lock mechanisms 40 has a lock function to keep the corresponding lid members 20 in a closed position. Each of the lock mechanisms 40 has an unlock function to release the lock state of the corresponding lid 20 (i.e., unlock the corresponding lid 20). Each of the lock mechanisms 40 allows the lid members 20 to be opened by an operational force applied thereto, independently of the other lock mechanism 40.

As illustrated in FIGS. 1 to 3 and 7 to 10, the seal bar 70 seals a gap between the right and left lid members 20. The illustrated seal bar 70 has a band-plate shape with a smooth and flat upper sealing surface 72. However, in other embodiments, the seal bar (e.g., seal bar 70) may have other configurations. The flat upper surface 72 of the seal bar 70 contacts the inner surfaces of the right and left lid members 20 for sealing the gap between the right and left lid members 20. To increase the cooling efficiency in the accommodating space 12, a bar sealing member 75 (see FIGS. 8 and 9) is attached to the flat upper sealing surface 72. The bar sealing member 75 can be made of elastic material, such as rubber. The longitudinal length (e.g., in the front to rear direction) of the seal bar 70 may be longer than the front-rear direction length of the opening 14, and may be shorter than the front-rear direction length of the box main body 10. The lateral width of the seal bar 70 may be larger than the width of the gap between the right and left lid members 20, and may be wide enough to contact the inner (backside) surfaces of the right and left lid members 20. The rear end portion of the seal bar 70 is attached to the box main body 10 via a bar hinge pin 80. The bar hinge pin 80 is positioned between the right and left hinge pins 30. The seal bar 70 has a bar pivotal axis at the bar hinge pin 80. The bar pivotal axis is aligned with the hinge pins 30 defining pivotal axes of the lid members 20.

In some embodiments (not illustrated), the left and right hinge pins 30 and the bar hinge pin 80 may be integrally formed as a single hinge pin. Such a single hinge pin may have a straight, substantially cylindrical geometry so as to align the pivotal axes of the lid members 20 and the bar hinge along the same axis. Some of the benefits of implementing a single hinge pin include, but are not limited to, a reduced number of components and a reduced assembly burden. Further examples of benefits include, but are not limited to, the box main body 10 including a fewer number of hinge pin supports, which reduces the amount of material needed and reduces weight.

As previously mentioned, the left and right lid members 20 and the seal bar 70 may have their pivot axes aligned substantially along a single axis. One of the benefits of aligning these axes is that it reduces the wear on the bar sealing member 75. More specifically, when the seal bar 70 and one or both of the lid members 20 concurrently pivot about the pivot axis, the seal bar 70 and the one or more lid member 20 may substantially maintain a static contact surface. Accordingly, the seal forces applied to the bar sealing member 75 may be reduced, thereby assisting with maintaining the sealing integrity and durability of the bar sealing member 75.

The front end portion of the seal bar 70 can be fitted in the recess 19 when one or both of the right and left lid members 20 are closed. In this embodiment, the thickness of the seal bar 70 may be substantially the same as the depth of the recess 19. Thus, the flat upper sealing surface 72 of the seal bar 70 and the upper end surface of the box main body 10 defining the opening 14 are substantially aligned within the same plane. The seal bar 70 may be biased by a bar torsional spring 82 in a direction that is the same as the opening directions of the right and left lid members 20. For example, the seal bar 70 may be biased so that the flat upper sealing surface 72 of the seal bar 70 contacts with the inner surface 22 of one and/or both of the right and left lid members 20. Thus, the seal bar 70 can pivot together with one or both of the right and left lid members 20.

For example, the seal bar 70 may contact both of the lid members 20 when they are in the closed position. However, when only one of the right and left lid members 20 is in the open position, with the other being in the closed position, the seal bar 70 may contact only the lid member 20 in the closed position. The seal bar 70 will continue to contact only the lid member 20 with a state closer to the closed position until such time that the right and left lid members 20 have approximately the same state of closure. When they have approximately the same state of closure, the seal bar 70 may contact both the right and left lid members 20. For instance, if one of the lid members 20 moves from a closed to open position while the other lid member 20 remains in the open position, the seal bar 70 will contact the lid member 20 that is opening until such time that it reaches the open position. When both the lid members 20 are in the open position, the seal bar 70 may contact both lid members 20. In such a state, the seal bar 70 by way of the bar sealing member 75 may seal the potential gap between the right and left lid members 20.

In some embodiments, the torsional springs 32 and the bar torsional spring 80 may have the same or different relative strengths. In this context, the relative strength of the respective torsional springs 32, 80 corresponds to the relative strength needed to pivot the lid member 20 or the seal bar 70 about its axis. For example, although the relative of strengths of the torsional springs 32, 80 may be the same, the bar torsional spring 80 may have an overall weaker strength, as less force may be needed to pivot the seal bar 70 as compared to a lid member 20.

In an embodiment where the relative strengths of the torsional springs are different (i.e., the biasing forces are different), the relative strength of the bar torsional spring 80 may be greater than the relative strength of the torsional springs 32. In this instance, there is a higher probability that the seal bar 70 will maintain contact with the backside surface of the lid member 20 positioned closer to the closed position. That is, there is a higher probability that a lid member 20 positioned closer to the closed position would be unable to open at a quicker rate than the seal bar 70, assuming that the torsional springs are the only opening force. This has benefits including, but not limited to, assisting with reducing damage to the sealing bar 70 and improving aesthetics while the lid member 20 is being opened.

Figure 5:
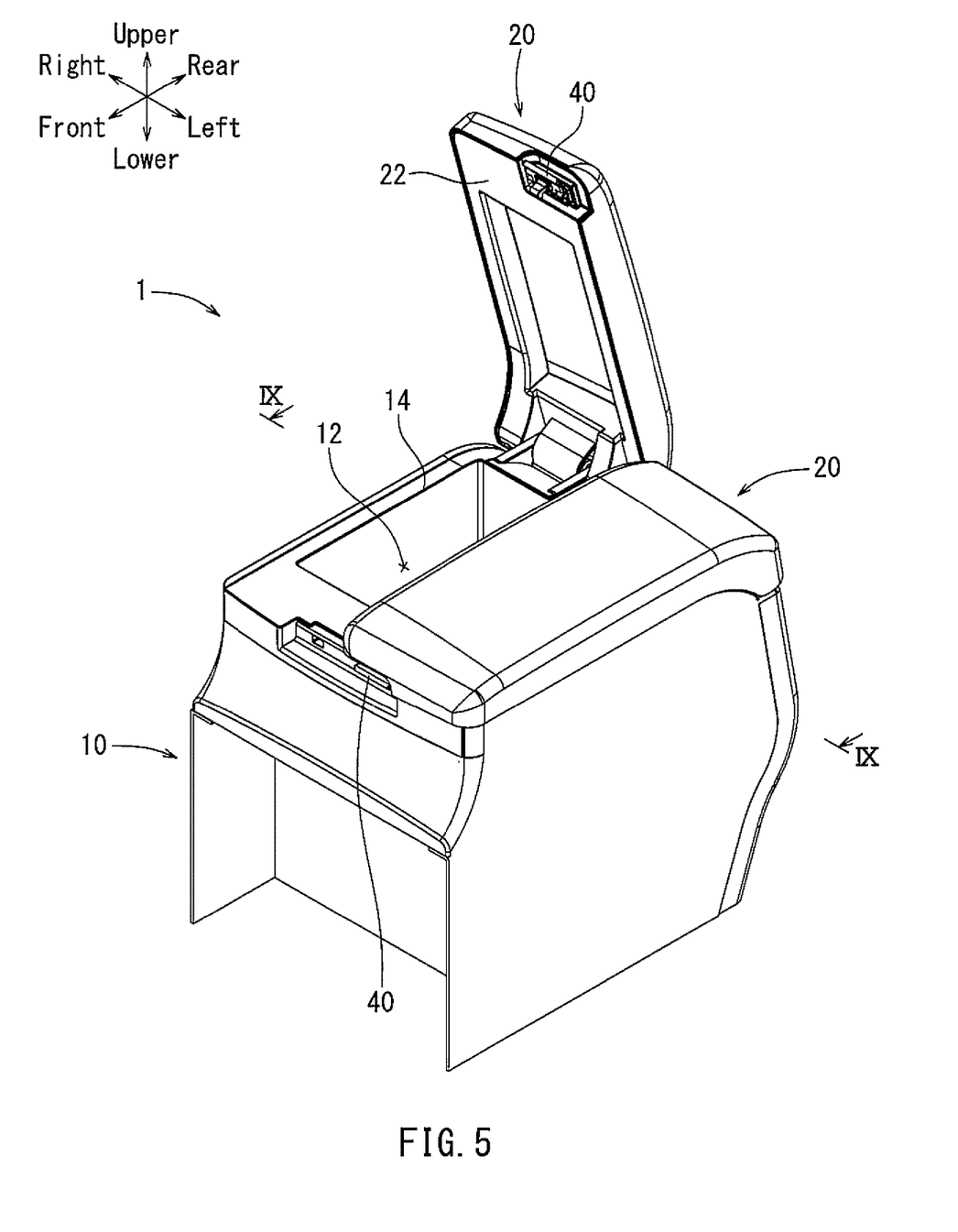
FIG. 5 is a perspective view of the console box of FIG. 1 when only the left lid is closed.
Figure 6:
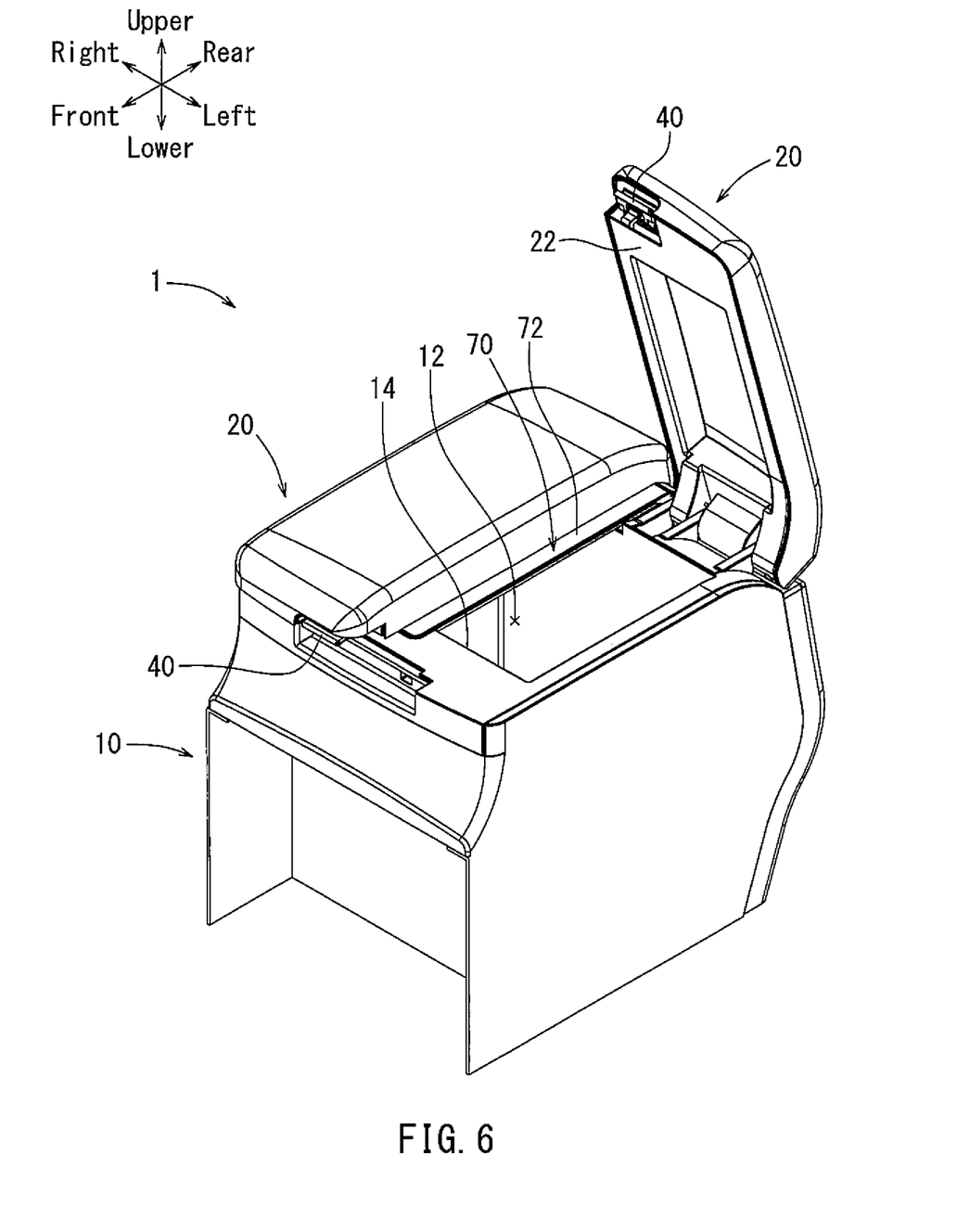
FIG. 6 is a perspective view of the console box of FIG. 1 when only the right lid is closed.
Figure 7:
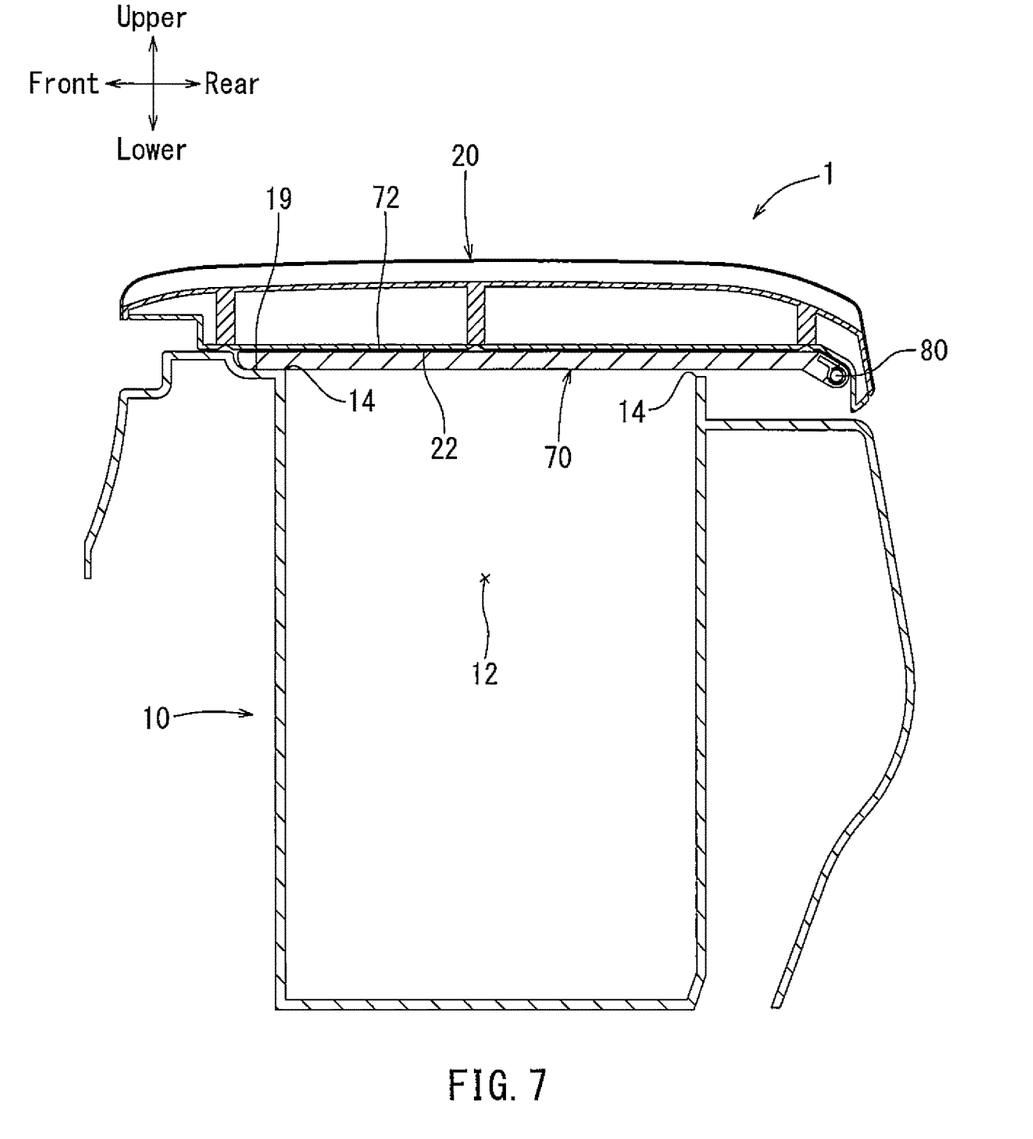
FIG. 7 is a sectional view of the console box of FIG. 1 taken along line VII-VII in FIG. 1.

If one of the right or left lid members 20 is opened from the closed state while the other lid 20 remains closed, the seal bar 70 may remain fitted in the recess 19, as illustrated in FIGS. 5 and 6. Then, if the other lid 20 also opens, the seal bar 70 may pivot together with the lid member 20 that is currently being opened. When the seal bar 70 pivots together with the lid member 20, it pivots so as to be removed from the recess 19. When both of the right and left lid members 20 are simultaneously opened from the closed states, the seal bar 70 may pivot together with both of the lid members 20, so as to be removed from the recess 19. On the other hand, if either the right lid member 20 or the left lid member 20 closes from the open state when they are both in the open state, the seal bar 70 is pressed by the closing lid member 20. In this manner, the seal bar 70 pivots together with the closing lid member 20, while contacting with the inner surface 22 of the closing lid 20. Thus, after one of the lid members 20 has moved to the closed position, the seal bar 70 does not interfere with the movement of the other lid member 20 toward the closed position. For instance, since the seal bar 70 has a width greater than the potential gap between the left and right lid members 20 when they are both in the closed state, the top (upper) surface of a lid member 20 has the potential of interfering with the seal bar 70 attempting to traverse it. Utilizing similar structuring as that described above prevents this interference, as the seal bar 70 is prevented from bypassing an upper surface of either of the left or right lid members 20.

As described above, in this embodiment, the console box 1 includes a seal bar 70 that seals a gap between right and left lid members 20, the seal bar 70 being able to pivot together with one or both of the right and left lid members 20 pivoting to an open or closed state. In this arrangement, when both of the right and left lid members 20 are closed, the potential gap formed between the right and left lid members 20 is sealed by the seal bar 70. Additionally, when both the right and left lid members 20 are in the open positions, the seal bar 70 is located away from the opening 14 and contacts with the right and left lid members 20, thereby sealing the potential gap. Thus, the seal bar 70 does not interfere or block access to the opening 14 when both the right and left lid members 20 are open.

The hinge pins 30 defining the pivotal axes of the right and left lid members 20 are aligned with the bar hinge pin 80 defining the pivotal axis of the seal bar 70. Thus, the lid members 20 and the seal bar 70 can pivot about the same axis. Additionally, the bar torsional spring 82 biases the seal bar 70 toward the inner surfaces of the lid members 20. In this arrangement, the appearance of the console box 1 is improved, and the seal bar 70 can pivot together with one or both of the right and left lid members 20 without of need of incorporating a complex moving mechanism. An additional benefit of aligning these axes is that it offers the potential to reduce wear of the bar sealing member 75. More specifically, when the seal bar 70 and one or both of the lid members 20 concurrently pivot about the pivot axis, the seal bar 70 and the one or more lid member 20 maintain a substantially static surface contact. Accordingly, the sear forces being applied to the bar sealing member 75 are reduced, thereby assisting with maintaining the sealing integrity of the bar sealing member 75.

The embodiment described above may be modified in various ways as follows. In the embodiment described above, the seal bar 70 is biased by the torsional spring 82 and pivots together with one or both of the right and left lid members 20. However, instead of employing the torsional spring, magnets may be attached to the inner surfaces of the lid members 20 and/or the seal bar 70. Alternatively, magnets may be attached to the inner surfaces of the lid members 20 (or the seal bar 70), and a magnetically attractive material such as iron may be attached to the seal bar 70 (or the inner surfaces of the lid members 20). With these alternative arrangements, the seal bar 70 also can pivot together with one or both of the right and left lid members 20. Further, in other embodiments, the console box 1 is provided with the lock mechanisms 40 for locking the lid members 20 in the closed positions. However, in other embodiments, the lock mechanisms 40 may not be provided. In some embodiments in which the lock mechanisms 40 are not provided, the torsional springs 32 of the lid members 20 may not be provided, while the bar torsional spring 80 is provided.

In another alternative embodiment, the seal bar 70 may not be pivotally attached to the box main body 10. Instead, the seal bar 70 may be positioned in the recess 19 and a rear recess (not illustrated) when at least one of the right and left lid members 20 is closed. However, when both of lid members 20 are open, the seal bar 70 may be temporarily attached to one or both of the lid members 20, for example by a magnetic force. More specifically, when at least one of the lid members 20 is in the closed state, such lid member 20 will cause the seal bar 70 to remain in the recess 19 and the rear recess. However, when both of the lid members 20 are not in the closed state, there will be an insufficient force applied to the seal bar 70 to overcome the lifting force (e.g., a magnetic force) of the opening lid member 20. The lifting force (e.g., magnets) used in this embodiment may have a strength sufficient to allow for both lid members 20 to be closed at the same time by pressing on only one of the lid members 20 and/or to prevent the seal bar from being inadvertently knocked off when both lid members are in the open state, but not a sufficient strength to substantially hinder opening only one of the lid members 20 at a time.

This configuration allows for benefits such as the lid members 20 being able to be opened in other directions than what has been described above, while still maintaining many of the benefits. For example, the lid members 20 can additionally or alternatively be opened by pivoting about the front to rear axis. Since the seal bar 70 would be held by the lid member 20 that was opened second, the seal bar 70 would not interfere with the opening 14 and the aesthetics can be maintained, since the seal bar 70 would not pivot about an axis towards the rear end of the box main body 10. Additionally, as the seal bar 70 is not directly attached to the box main body 10 at a single fixed pivot point, implementations may be realized where the lid members 20 are dynamically open by selectively pivoting about the front to rear axis or the right to left axis.

With at least some of the embodiments described above, when both of the pair of lid members 20 are closed, the potential gap formed between the pair of lid members 20 can be closed by the seal bar 70. Additionally, when both of the pair of lid members 20 are opening, the seal bar 70 moves away from the opening 14 and contacts with the pair of lid members 20. Thus, user can access the inside of the console box 1 via the opening 14 without interference by the seal bar 70.

Some embodiments described above allow both at least one of the pair of lid members 20 and the seal bar 70 to pivot together about the same axis and thus, the appearance of the console box 1 can be improved.

At least some of the embodiments described above allow the seal bar 70 to pivot together with at least one of the pair of lid members 20 without of need of incorporating a complex moving mechanism.

What is claimed is:

1. A console box, comprising:
    a box body with an opening;
    a pair of lid members, wherein each lid member is pivotally coupled to the box body with a hinge for opening and closing a corresponding portion of the opening, wherein the pair of lid members are configured to pivot in a same direction for opening or closing the corresponding portions of the opening; and
    a seal bar pivotally coupled to the box body and configured to close a gap between the pair of lid members, wherein the seal bar is configured to pivot relative to the box body and follow the movement of at least one of the pair of lid members.

2. The console box of claim 1, wherein the hinges of the pair of lid members define a pair of corresponding pivotal axes of the pair of lid members, wherein the pivotal axes are aligned with each other and are aligned with a pivotal axis of the seal bar.

3. The console box of claim 1, further comprising a biasing member configured to bias the seal bar toward a backside surface of each of the pair of lid members, wherein each of the backside surfaces is positioned on a side of a closing direction of the corresponding lid member.

4. A console box, comprising:
    a box body with an opening;
    a first lid member and a second lid member, wherein each lid member is movably coupled to the box body, wherein the first lid member is configured to move between an open position and a closed position for opening and closing a first portion of the opening, and wherein the second lid member is configured to move between an open position and a closed position for opening and closing a second portion of the opening;
    a seal device configured to close a gap between the first lid member and the second lid member when both of the first and second lid members are in the closed positions; and
    a movement device configured to move the seal device from a first position to a second position away from the first position in response to movement of at least one of the first and second lid members from the closed position to the open position.

5. The console box of claim 4, wherein at least one of the first and second lid members is configured to move the seal device from the second position to the first position in response to movement of at least one of the first and second lid members from the open position to the closed position.

6. The console box of claim 4, wherein when both the first and second lid members are in the open positions, the first and second lid members are configured to move the seal device from the second position to the first position in response to movement of the first lid member or the second lid member or both from the open position to the close position.

7. The console of claim 4, wherein:
    the first lid member is configured to pivot relative to the box body about a first axis,
    the second lid member is configured to pivot relative to the box body about a second axis, and
    the first axis and the second axis are aligned such that the first lid member and the second lid member are positioned side-by-side relative to each other when both of the first and second lid members are in the closed positions.

8. The console box of claim 4, wherein:
    the seal device contacts a portion of a backside surface of each of the first and second lid members, and
    the backside surfaces of the first and second lid members face the opening of the box body when the first and second lid members are in the closed positions.

9. The console box of claim 7, wherein the seal device is configured to pivot relative to the box body about a third axis that is aligned with the first and second axes.

10. The console box of claim 4, wherein the movement device comprises a biasing member configured to bias the seal device from the first position to the second position.

11. The console box of claim 9, wherein the seal device comprises a seal bar having a first end and a second end opposite to the first end, wherein the first end is coupled to the box body with a hinge defining the third axis, and wherein the second end is a free end configured to move toward and away from the box body.

12. The console box of claim 11, wherein:
    a recess is formed in an end portion of the box body defining the opening, and
    the recess is configured to receive the second end of the seal bar when at least one of the first and second lid members is in the closed position.

13. The console box of claim 4, wherein the seal device comprises a seal bar and a sealing member attached to an upper surface of the seal bar, wherein the upper surface of the seal bar faces the gap when both of the first and second lid members are in the closed positions.

14. The console box of claim 11 wherein the seal bar has a length in a longitudinal direction longer than a length of the opening in the longitudinal direction.

15. The console box of claim 4, wherein the movement device is configured to move the seal device from the first position to the second position in response to movement of one of the first lid member or the second lid member from the closed position to the open position, if the other of the first or second lid members is in the open position.

16. A console box, comprising:
    a box body defining a storage chamber opened to an outside via an opening;
    a first lid member and a second lid member movably coupled to the box body, the first lid member being movable between an open position and a closed position for opening and closing a first portion of the opening, and the second lid member being movable between an open position and a closed position for opening and closing a second portion of the opening; and
    a seal device configured to seal a gap between the first lid member and the second lid member when the first and second lid members are in the open positions.

17. The console box of claim 16, wherein a major plane of the seal device is non-parallel with a major plane of the opening when the first and second lid members are in the open positions.

18. The console box of claim 16, wherein a major plane of the seal device is parallel with a major plane of the opening when the first and second lid members are in the closed positions.

19. The console box of claim 16, wherein the seal device is configured to seal the gap between the first lid member and the second lid member when the first and second lid members are in the closed positions.

20. The console box of claim 16, wherein the seal device is configured to not seal the gap between the first lid member and the second lid member when one, but not the other, of the first and second lid members is in the closed position.

* * * * *